United States Patent [19]

Rochow et al.

[11] 4,155,166
[45] May 22, 1979

[54] DIPSTICK AND PLUG ASSEMBLY

[75] Inventors: Donald W. Rochow; Albert J. Karls, both of Greenville, Miss.

[73] Assignee: Moeller Manufacturing Co., Inc., Greenville, Miss.

[21] Appl. No.: 854,205

[22] Filed: Nov. 23, 1977

[51] Int. Cl.² ............................................. G01F 23/04
[52] U.S. Cl. ............................................... 33/126.7 R
[58] Field of Search .................................. 33/126.7 R

[56] References Cited

U.S. PATENT DOCUMENTS

| Re. 26,422 | 7/1968 | Stade et al. | 33/126.7 R |
|---|---|---|---|
| 3,371,418 | 3/1968 | Moeller | 33/126.7 R |
| 3,377,708 | 4/1968 | Gassman et al. | 33/126.7 R |
| 3,626,596 | 12/1971 | Manke | 33/126.7 R |
| 3,722,102 | 3/1973 | Jackson et al. | 33/126.7 R |
| 4,021,924 | 5/1977 | Haines | 33/126.7 R |
| 4,067,113 | 1/1978 | Haines et al. | 33/126.7 R |

*Primary Examiner*—Richard R. Stearns
*Attorney, Agent, or Firm*—Berman, Aisenberg & Platt

[57] ABSTRACT

The combination of a dipstick and plug assembly adapted to be inserted within a standard oil filler tube of an engine. In a preferred embodiment, the assembly includes a molded cap element having an integrally formed handle for facilitating gripping thereof. Positioned underneath the cap element is a preferably separately formed, molded cylindrical body which is adapted to be fitted within the oil filler tube. The dipstick comprises a blade member which extends through an aperture in the cylindrical body and is embedded within the cap element. The cylindrical body has a pair of O-rings extending peripherally thereabout. The upper O-ring is integrally molded with the body and serves as a sealing means for the tube. The lower O-ring comprises a separately formed, flexible O-ring which is disposed within a groove formed in the cylindrical body and is adapted to facilitate the insertion and withdrawal of the assembly in the filler tube.

15 Claims, 8 Drawing Figures

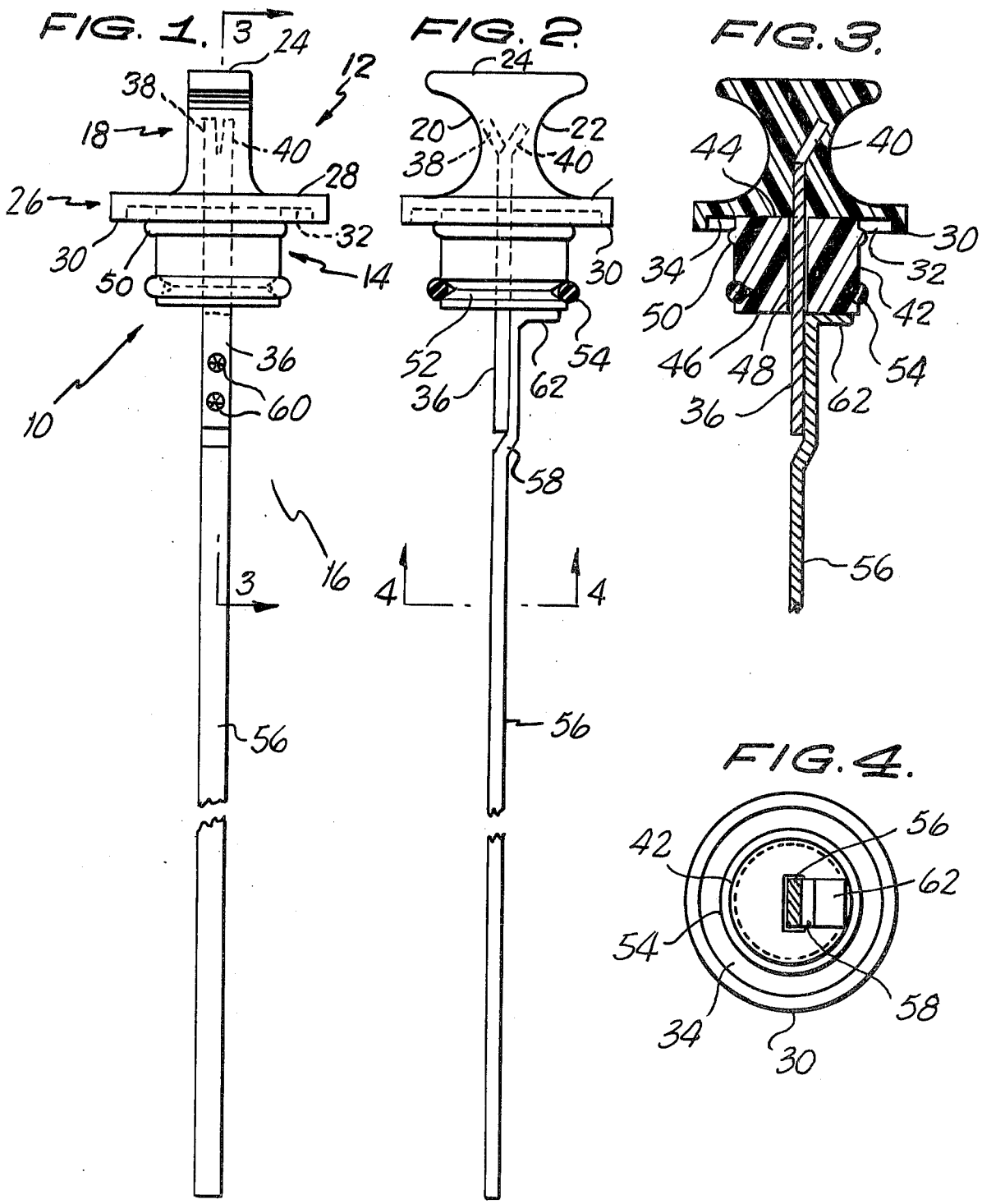

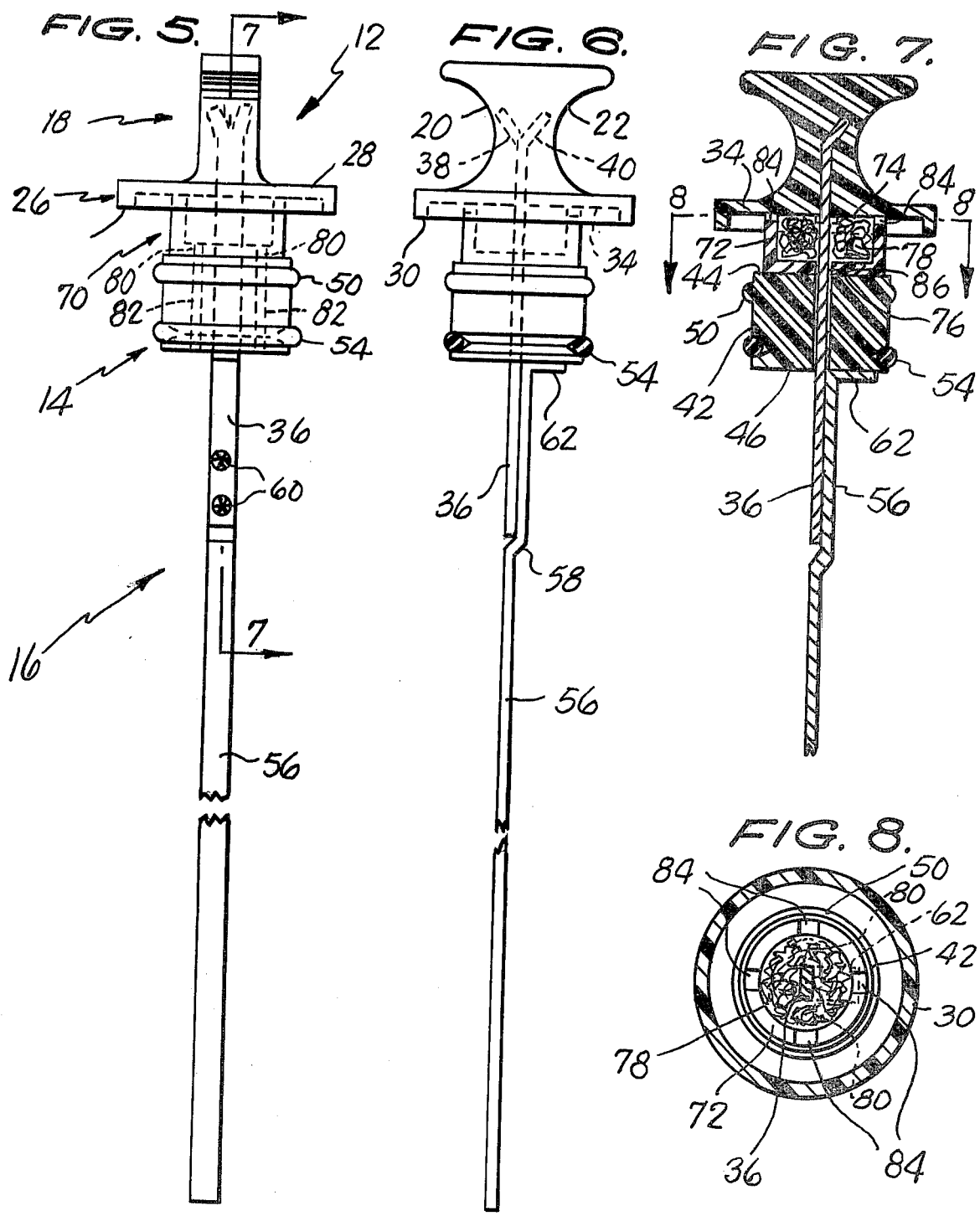

DIPSTICK AND PLUG ASSEMBLY

BACKGROUND OF THE INVENTION

1. Field of the Invention

The present invention is related to dipstick assemblies and, more particularly, is directed towards a novel combination of a dipstick and plug for an oil filler tube of an engine.

2. Description of the Prior Art

Several United States patents are known to us which broadly disclose dipstick and plug assemblies adapted to be inserted within an oil filler tube of an engine. These include: U.S. Pat. Nos. 2,343,168; 3,269,703; 3,371,418; and 3,626,596.

The first-named patent to Bickle (U.S. Pat. No. 2,343,168) sets forth a dipstick gauge which includes a dipstick to one end of which is connected a handle and having a stop collar formed intermediate the handle and the gauge.

U.S. Pat. No. 3,296,703 to Stade et al sets forth a dipstick have a finger ring serving as a handle. Two pair of disc washers are secured about the blade of the dipstick below the handle and serve to hold a pair of O-rings. The O-rings, in turn, provide a fluid-tight connection in the bore of the oil filler tube.

The Moeller U.S. Pat. No. 3,371,418 sets forth a dipstick assembly which features a closure means for the oil filler tube that comprises a resilient compressible body with peripheral sealing ribs formed thereabout.

U.S. Pat. No. 3,625,596 to Manke teaches a dipstick and plug assembly wherein a cylindrical plug includes a plurality of specially shaped projections formed peripherally thereabout which contact the inner surface of the oil filler tube. The dipstick is embedded within the shank of the plug, the latter also including an integrally formed handle.

While the prior art patents discussed above illustrate the progression of this art through the years, presently available dipstick and plug assemblies nevertheless continue to suffer from several deficiencies. Initially, it may be noted that the prior art assemblies are far too complex to be produced cheaply and efficiently, which results in an undesirably expensive item being provided to the consumer.

Secondly, the prior art devices, while purporting to perform the two distinct functions required of them, i.e., both sealing the filler tube against outside dirt and contamination, and holding the dipstick in place within the tube, generally fail to perform both functions with equal proficiency. Some of the designs, for example, while providing an efficient seal, tend to "walk out" of the filler tube as a result of normal vibrations encountered during engine operation. This is believed due to the provision of overly flexible sealing means. Other designs attempt to overcome this problem by providing integrally formed relatively rigid ribs about the periphery of the plug. However, as evidenced by the Manke patent, such ribs must be formed in a special shape to prevent undue binding of the plug in the oil filler tube during insertion and withdrawal. Such special shapes tend to increase production costs unduly, to the ultimate detriment of the consumer.

OBJECTS AND SUMMARY OF THE INVENTION

It is therefore a primary object of the present invention to provide a new and improved dipstick and plug assembly which overcomes all of the deficiences noted above with respect to prior art devices.

Another object of the present invention is to provide a dipstick and plug assembly adapted to be inserted within an oil filler tube of an engine, which is simple in structure and economical to produce.

An additional object of the present invention is to provide a dipstick and plug assembly which both seals the oil filler tube and retains the dipstick in place in the tube with equal effectiveness.

A still further object of the present invention is to provide a new and improved dipstick and plug assembly which may be readily manufactured with existing technology, which utilizes conventional components, and which is readily adaptable to mass production for providing an inexpensive consumer product.

The foregoing and other objects are attained in accordance with one aspect of the present invention through the provision of a dipstick and plug assembly adapted to be inserted within an oil filler tube of an engine, which comprises a cap element including handle means for facilitating the gripping thereof, means disposed below the cap element for retaining the assembly within the tube and for permitting withdrawal thereof, and blade means extending through the retaining means and having one end secured within the cap element, the other end of the blade means including means for measuring the oil level in the engine. The retaining means comprises a substantially cylindrical body having formed about the periphery thereof a first O-ring integrally molded with the cylindrical body. A second O-ring is formed separately from the cylindrical body and is subsequently positioned about the periphery thereof. The second O-ring is preferably fitted within a V-shaped groove formed about the cylindrical body. The cylindrical body includes upper and lower substantially planar end surfaces, the first O-ring positioned near the upper end surface while the second O-ring is positioned near the lower surface.

In accordance with other aspects of the present invention, means are provided which are connected to the blade means for holding the retaining means adjacent the cap element. The holding means comprises an L-shaped projection which extends from the blade means at a position adjacent the underside of the cylindrical body. In a preferred form, the blade means comprises first and second blade members, the first blade member extending through the retaining means and having one end bent and embedded within the cap element, while the second blade member comprises said means for measuring the oil level in the engine and includes one L-shaped end which comprises said holding means. The first and second blade members are positioned adjacent and fastened to one another between the L-shaped end of the second blade member and the other end of the first blade member.

The handle means may comprise a rigid, I-shaped handle having first and second arcuate, complementary positioned finger recesses formed therein, while the cap element also includes a disc-shaped base member from the top of which integrally extends the handle means. The underside of the base member includes a substantially planar recessed portion having a peripherally extending shoulder, the diameter of which is greater than that of the cylindrical body, the upper end of the cylindrical body abutting the planar recessed portion of the cap member.

In accordance with still other aspects of the present invention, means may be positioned between the cap element and the retaining means for serving as a breather cap for the oil filler tube. The breather cap means may include means for filtering air passing therethrough, and more particularly may comprise a substantially rigid, cylindrical cup member having a bottom wall which abuts the top wall of the cylindrical body and includes an aperture through which the blade means extends. A side wall of the cup member has air vents formed near the top portion thereof, while the bottom wall preferably also includes a second aperture formed therein for communicating with an air vent extending vertically through the cylindrical body.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which:

FIG. 1 is a side, elevational view, partly broken, of a first preferred embodiment of the dipstick and plug assembly of the present invention;

FIG. 2 is a side view, partially in section, of the preferred embodiment of the present invention illustrated in FIG. 1;

FIG. 3 is a sectional view of the preferred embodiment illustrated in FIG. 1 and taken along line 3—3 thereof;

FIG. 4 is a cross-sectional view of the preferred embodiment of the present invention taken along line 4—4 of FIG. 2;

FIG. 5 is a view similar to that of FIG. 1 but which illustrates an alternative embodiment of the present invention;

FIG. 6 is a side view of the alternate embodiment illustrated in FIG. 5;

FIG. 7 is a sectional view of the alternate embodiment illustrated in FIG. 5 and taken along line 7—7 thereof; and FIG. 8 is a cross-sectional view of the alternate preferred embodiment which is taken along line 8—8 of FIG. 7.

DETAILED DESCRIPTION OF THE PREFERRED EMBODIMENTS

Referring now to the drawings, wherein like reference numerals represent identical or corresponding parts throughout the several views, and more particularly to FIG. 1 thereof, there is illustrated a first preferred embodiment of the dipstick and plug assembly of the present invention which is indicated generally by reference numeral 10.

Assembly 10 comprises a cap element indicated generally by reference numeral 12, a retainer element positioned underneath the cap element 12 and indicated generally by reference numeral 14, and a blade portion indicated generally by reference numeral 16 which extends through the retainer element 14 so that one end thereof is positioned within the cap element 12.

The cap element 12 is preferably formed of molded hard rubber, or equivalent material, and includes a rigid, I-shaped handle portion 18. As seen in FIG. 2, handle portion 18 includes a pair of arcuately shaped, complementary side recesses 20 and 22. The recesses 20 and 22 are designed for the purpose of receiving the first and second fingers of a user's hand to facilitate insertion and extraction of the assembly 10 into and out of the oil filler tube (not shown). The top portion 24 of the handle portion 18 extends between the side recesses 20 and 22 and provides a convenient thumb rest in use.

Integrally molded with handle portion 18 is a disc-shaped base which is indicated generally in FIG. 1 by reference numeral 26. The base portion 26 comprises a substantially planar top 28 which terminates about the edge thereof in a downwardly extending peripheral lip 30. The lip 30, more clearly shown in FIG. 3, forms a recess 32 for receiving the retainer element 14 as well as a standard engine oil filler tube (not shown) within which the assembly 10 of the present invention is intended to be inserted and withdrawn, as desired. The recess 32 of base portion 26 preferably is formed with a planar surface 34 that serves as a shoulder for the oil filler tube, as will become more clear hereinafter.

The cap element 12 is preferably molded about a blade element 36 which forms part of the blade portion 16. One end of blade element 36 is preferably split to form bifurcated ends 38 and 40 which are bent at an angle with respect to the axis of blade 36 to firmly retain blade 36 in the handle portion 18 of cap element 12 after molding.

The retainer element 14 is preferably separately formed from the cap element 12 and is adapted to be positioned immediately thereunder, as is evident from FIG. 3. Retainer element 14 comprises a substantially cylindrical, molded body member 42 which may consist of the same relatively rigid material from which cap element 12 is formed. Cylindrical body 42 includes upper and lower planar end portions 44 and 46, and has a slot 48 formed and extending centrally therethrough for receiving the blade element 36.

Formed peripherally about the cylindrical body member 42, near the upper end 44, is a first O-ring 50 which is preferably integrally molded with body 42 in the same operation. At the lower portion of cylindrical body member 42 is peripherally formed a V-shaped groove 52 which is adapted for receiving a standard, resiliently flexible O-ring 54, preferably formed of flexible rubber or like substance, and which is non-integrally formed with the body 42. That is, O-ring 54 must be separately installed on body 42, while O-ring 50 is integrally molded therewith. The O-rings 50 and 54 are respectively spaced about the same distance from the ends 44 and 46 of cylindrical body member 42.

Completing the preferred embodiment of FIGS. 1 through 4 is a second blade element 56 which is the actual dipstick utilized for determining the amount of oil in the engine. In a preferred embodiment, the blade element 56 is offset as at 58 and is positioned adjacent the lower portion of the first blade element 36 above offset 58. The two blade elements 36 and 56 are secured at their adjacent portions, as by spot welding at 60. The upper end of blade element 56 is preferably bent at a right angle to form a retaining flange 62 for holding the retainer element 14 in place.

In assembling the components of the present invention, the cap element 12 is initially molded with the upper bifurcated end of blade element 36 embedded therein. The separately formed retainer element 14 is then inserted via aperture 48 about blade element 36, and then the second blade element 56 is secured to the first blade element 36 with the flange 62 pressing upwardly against the lower end 46 of retaining element 14.

We have found that the provision of two O-rings, one molded to the cylindrical body member 42 and the other separately formed, provides a more secure seal with concomitant greater retention of the assembly within the oil filler tube and easier insertion and withdrawal, than heretofore possible. The molded O-ring 50 is positioned near the top of the retaining element 14 to act as an effective seal for the oil filler tube against dirt and contamination. The greater rigidity of the molded O-ring 50, when compared with the relatively resilient and flexible separately formed O-ring 54, ensures a tight seal at the top of the tube where O-ring 50 is positioned in use. The lower, separately formed O-ring 54 is preferably made of a more flexible material than the integrally molded O-ring 50 and thereby provides greater ease of movement of the assembly 10 when being inserted into and withdrawn from the tube. The combination, therefore, of the integral O-ring 50 and the separate O-ring 54 provides an effective seal, prevents the assembly from "walking out" of the tube during use and facilitates manual insertion and withdrawal.

Referring now to FIGS. 5 through 8, an alternate embodiment of the present invention is illustrated wherein many of the same elements utilized in the embodiment of FIGS. 1 through 4 are again utilized.

The alternate embodiment shown in FIGS. 5 through 8 is modified from the first embodiment by the provision of a filter element indicated generally by reference numeral 70 positioned intermediate the cap element 12 and retainer element 14. The filter element 70 serves as a breather cap for the oil filler tube and more particularly comprises a substantially cylindrical cup member 72 having an open upper end 74 which abuts shoulder 34 of cap element 12, and a lower wall 76 which abuts the upper end 44 of retainer element 14.

Positioned within the filter element 70 is an air filter material 78, which may be comprised of any standard air filter material, such as polyurethane or the like.

In the lower wall 76 of cup member 72 is formed a central aperture 86 through which blade 36 extends. Also formed in wall 76 is one or a plurality of air vents 80. The air vents 80 are in axial communication with one or a plurality of air vents 82 (FIG. 5) formed in retainer element 14. The air vents 80 and 82 place the filter material 72 in open communication with the crankcase of the engine via the oil filler tube. Also provided are air vents 84 formed about the periphery of the open end 74 of the cylindrical cup member 72.

The alternate embodiment of FIGS. 5 through 8 therefore provides a means for permitting the inside of the crankcase area of the engine to be vented and allowed to breathe, and is an improvement over the basic embodiment of the present invention illustrated in FIGS. 1 through 4.

Obviously, numerous modifications and variations of the present invention are possible in light of the above teachings. It is therefore to be understood that within the scope of the appended claims, the invention may be practiced otherwise than as specifically described herein.

We claim as our invention:

1. A dipstick and plug assembly adapted to be inserted within a tube of an engine, which comprises:
   a cap element;
   retaining means disposed below said cap element adapted to retain said assembly within said tube and to permit easy insertion and withdrawal thereof; and
   blade means extending through said retaining means and having one end secured within said cap element, the other end of said blade means including means for indicating the oil level in said engine;
   said retaining means comprising a substantially cylindrical body having positioned about the periphery thereof one O-ring integrally molded with said cylindrical body and a second O-ring formed separately from said body.

2. The assembly as set forth in claim 1, wherein said substantially cylindrical body of said retaining means further includes a V-shaped groove formed about the periphery thereof for receivably retaining said second O-ring therein.

3. The assembly as set forth in claim 1, wherein said cylindrical body has upper and lower substantially planar end surfaces, and wherein said one O-ring is positioned near said upper end surface and said second O-ring is positioned near said lower end surface.

4. The assembly as set forth in claim 1, further comprising means connected to said blade means for holding said retaining means adjacent said cap element.

5. The assembly as set forth in claim 4, wherein said holding means comprises a projection extending from said blade means at a position adjacent the underside of said cylindrical body.

6. The assembly as set forth in claim 5, wherein said blade means comprises first and second blade members, said first blade member extending through said retaining means and having one end bent and embedded within said cap element; said second blade member comprising said means for indicating the oil level in said engine and having one L-shaped end which comprises said holding means, said first and second blade members being adjacent and fastened to each other between said L-shaped end of said second blade member and the other end of said first blade member.

7. The assembly as set forth in claim 1, wherein said cap element includes handle means comprising a rigid I-shaped handle having first and second arcuate, complementary positioned finger recesses formed therein.

8. The assembly as set forth in claim 1, wherein said cap element further comprises a disc-shaped base member from the top of which integrally extends said handle means, the underside of said base member including a substantially planar recessed portion having a peripherally extending shoulder of a diameter greater than said cylindrical body, the upper end of said cylindrical body abutting said planar recessed portion.

9. The assembly as set forth in claim 1, and further comprising means positioned between said cap element and said retaining means for serving as a breather cap for said tube.

10. The assembly as set forth in claim 9, wherein said breather cap means includes means for filtering air passing therethrough.

11. The assembly as set forth in claim 10, wherein said breather cap means comprises a substantially rigid cylindrical cup member having a bottom wall which abuts the top wall of said cylindrical body and includes an aperture through which said blade means extends, and a side wall having air vents formed near the top portion thereof.

12. The assembly as set forth in claim 11, wherein said bottom wall of said cup member includes a second aperture formed therein, and wherein said cylindrical body includes an air vent extending vertically therethrough and aligned with said second aperture in said cup member.

13. The assembly as set forth in claim 1, wherein said one O-ring comprises a relatively rigid material compared with said second O-ring which comprises a relatively flexible material.

14. The assembly as set forth in claim 1, wherein said cylindrical body and said one O-ring integrally formed therewith are relatively hard, and wherein said separately formed second O-ring is relatively flexible.

15. In a dipstick and plug assembly adapted to be inserted within a tube of an engine and which includes a handle, a plug disposed below said handle, and a dipstick blade extending through said plug and having one end embedded in said handle, the improvement which comprises a first O-ring integrally formed with and positioned about said plug and a second O-ring formed separately from and positioned about said plug.

* * * * *